US008733689B2

(12) United States Patent
Martínez Valdegrama et al.

(10) Patent No.: US 8,733,689 B2
(45) Date of Patent: May 27, 2014

(54) DEVICE FOR PROVIDING ELECTRICAL CONTINUITY BETWEEN AERONAUTICAL COMPONENTS WITH RELATIVE MOVEMENT

(75) Inventors: Vicente Martínez Valdegrama, Alpedrete (ES); José Luis Lozano García, Getafe (ES); Gonzalo Ramírez Blanco, Madrid (ES)

(73) Assignee: Airbus Operations, S.L., Getafe Madrid (ES)

( * ) Notice: Subject to any disclaimer, the term of this patent is extended or adjusted under 35 U.S.C. 154(b) by 876 days.

(21) Appl. No.: 12/882,251

(22) Filed: Sep. 15, 2010

(65) Prior Publication Data

US 2011/0111605 A1 May 12, 2011

(30) Foreign Application Priority Data

Oct. 2, 2009 (JP) .................................. P2009-30782

(51) Int. Cl.
B64D 3/00 (2006.01)

(52) U.S. Cl.
USPC ............................................................ 244/3

(58) Field of Classification Search
USPC ........ 439/20–26, 848, 839, 1; 244/80, 3, 100; 403/16
See application file for complete search history.

(56) References Cited

U.S. PATENT DOCUMENTS 2,203,973 A * 6/1940 Walls ............................. 439/848
3,670,995 A * 6/1972 Swearingen .................... 244/80
3,957,381 A * 5/1976 Schafer ........................... 403/16
5,088,661 A * 2/1992 Whitener ..................... 244/76 R
5,535,963 A * 7/1996 Lehl et al. .......................... 244/3
6,454,205 B2 * 9/2002 Niemeyer et al. ............ 244/3.26
6,659,393 B1 * 12/2003 Biserød ........................ 244/3.24
6,880,781 B2 * 4/2005 Fabiani ...................... 244/17.11
7,262,394 B2 * 8/2007 August .......................... 244/3.3
7,535,706 B2 * 5/2009 Herberholt et al. ....... 361/679.41
7,601,004 B2 * 10/2009 Lamoree et al. ................ 439/11
7,837,519 B2 * 11/2010 Copper et al. ................ 439/839
7,857,261 B2 * 12/2010 Tchoryk et al. ............. 244/172.4
8,070,090 B2 * 12/2011 Tayman ........................ 244/7 C
8,156,628 B2 * 4/2012 Roth ............................. 29/426.1
8,240,613 B2 * 8/2012 Ritter et al. ................. 244/172.4
8,317,552 B2 * 11/2012 Leroyer et al. ............... 439/839
8,360,357 B2 * 1/2013 Cazals et al. .................... 244/46
2007/0210212 A1 * 9/2007 Tchoryk et al. ............. 244/172.4

* cited by examiner

Primary Examiner — Alexander GGilman
(74) Attorney, Agent, or Firm — Wenderoth, Lind & Ponack, L.L.P.

(57) ABSTRACT

A device provides electrical continuity between aeronautical components including a first fixed component and a second component displaceable with respect to the first component. The first and second components include electrically conducting surfaces. A first conductive piece is fixed to the first component and a second conductive piece is fixed to the second component. The first and second pieces are joined together with the possibility of sliding one on the other, in such a way that the first piece is connected to the conductive surface of the first component and the second piece is connected to the conductive surface of the second component, so that, when displacements take place of the second component with respect to the first component, the first piece slides on the second piece maintaining the electrical conductivity between the first and second components.

5 Claims, 5 Drawing Sheets

Figure 1:
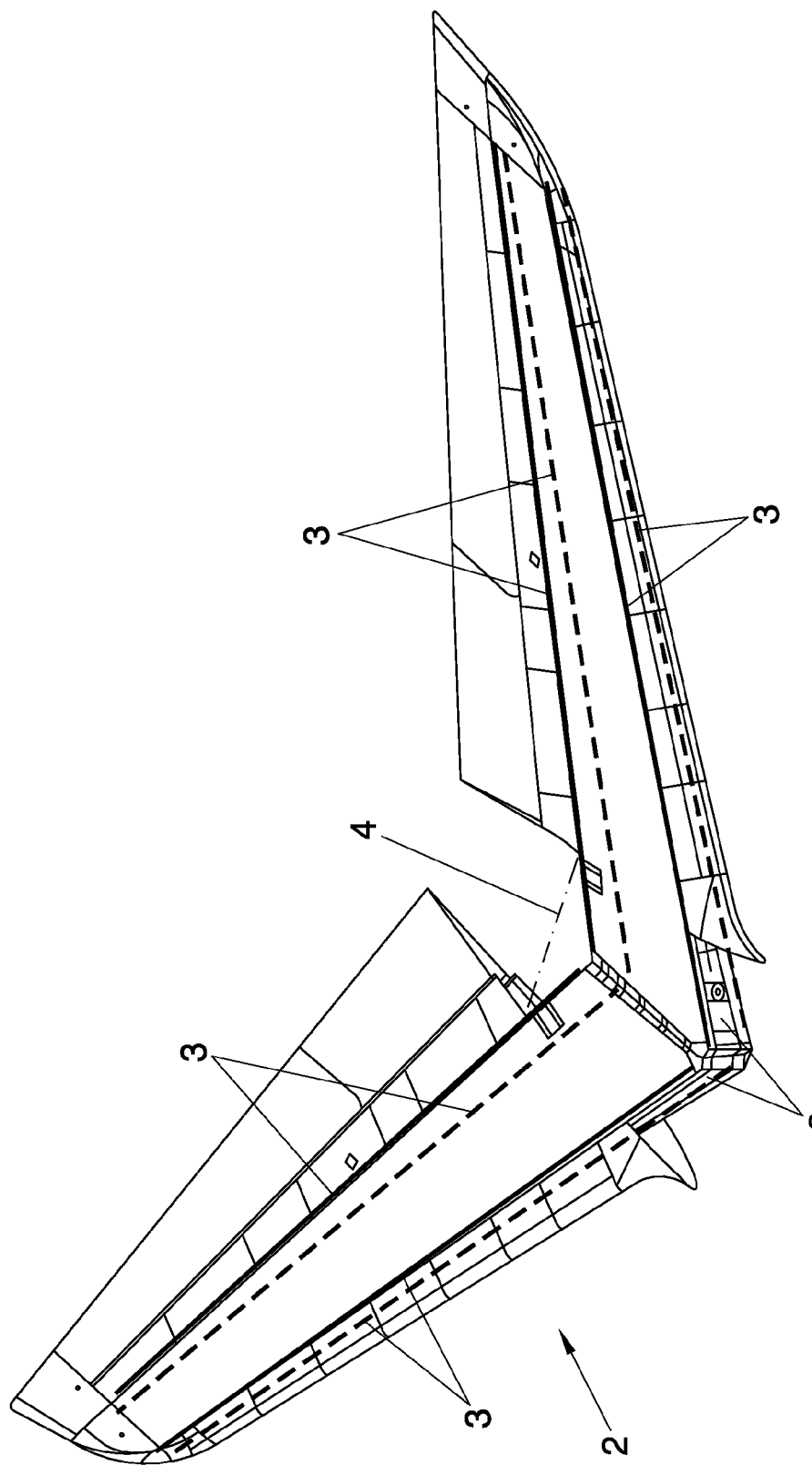

DEVICE FOR PROVIDING ELECTRICAL CONTINUITY BETWEEN AERONAUTICAL COMPONENTS WITH RELATIVE MOVEMENT

OBJECT OF THE INVENTION

The object of the present invention is to provide an optimized device making it possible to establish electrical continuity between large aeronautical components with relative movement.

Consequently, the invention is mainly applicable in the aeronautical industry, but it can also be applicable in any other industry in which it is required to establish electrical continuity between components with relative movement.

BACKGROUND OF THE INVENTION

In the state of the art of aircrafts it is known that aircrafts must maintain electrical conductivity along their structure, to avoid any serious damage therein in the case of lightning, caused by atmospheric agents, striking the aircraft, inasmuch as if this circumstance happens the lightning would go across the aircraft structure and go out to the outside without causing any serious damage.

In this way, for example, the electrical connection between the aircraft's horizontal stabilizer HTP and the fuselage section of the aircraft which receives it is carried out by means of conductive hoses maintaining the conductivity between these two components.

Usually, the electrical safety network of the horizontal stabilizer consist of four main static discharge wicks for each one of the sides of the horizontal stabilizer, going through the torsion box parallel to the front and rear spars and are located on the inner face of the upper and lower coatings of said box. The rest of the elements that are part of the horizontal stabilizer and must be electrically interconnected, are connected in turn to these main wicks.

These main static discharge wicks, in turn, must be connected to the electrical network of the rest of the plane in several positions, for which reason they are connected to the fuselage by means of hoses allowing the electrical continuity to be established between both components.

As it is known, the HTP is provided to be able to rotate with respect to the fuselage, so that it can pivot around an axis located at the rear part of the torsion box, allowing its trimming movement. This movement makes the relative position between the stabilizer and the fuselage not fixed, and the distances between both elements are variable at all times according to the trim position.

In this way, the distances between the chosen points do not remain constant between both components for the hose connection. This variation of distances has to be absorbed by the hoses, so that their lengths have to be enough to cover the entire range of possible positions.

As a result of the aforementioned, the length of the connection hoses is such that it complicates its installation; as a result it is difficult to combine their kinematics with the kinematics of the interconnecting elements.

Joining the rear part results relatively simple, as the trimming axis of the HTP is arranged at its rear part, which determines that the distances between the points to be connected do not undergo large variations due to the trimming movement.

The major problem exists in the front area of the stabilizer, where the distance to the rotation axis may become of the order of meters, sustaining to large sweeps in the trimming movement in the front part, and consequently longer hose lengths are required, of the order of meters, being capable of absorbing relatively large movements. These hose lengths are awkward to handle.

Trying to solve these problems is what has determined the development of a new electrical connection device that avoids the use of hoses, especially in the front part of the HTP.

DESCRIPTION OF THE INVENTION

In order to attain the aims and avoid the aforementioned drawbacks, the invention consists of a new device applicable in aeronautical structures in order to provide electrical continuity between the aeronautical components comprised by the structure, and having relative movement to each other. For this purpose said structure is provided with at least a first fixed component and a second component displaceable with respect to the first component, so that the first and second components are provided with an electrically conductive surface in order to allow electrical conductivity through them. It is necessary to perform the electrical connection between the first and second components in order to maintain the electrical conductivity between both of them. For this purpose, the invention is characterized in that it comprises at least a first conductive piece attached to the first fixed component and a second conductive piece attached to the second component displaceable with respect to the first component. Moreover, the first and second pieces are joined together with the possibility of sliding one over the other, in such a way that it is possible to establish continuity of electrical conductivity between the first and second components. For this reason the first piece is connected to the conductive surface of the first component and the second piece is connected to the conductive piece of the second component, so that, when the displacement of the second component with respect to the first one takes place, the sliding of the first piece on the second piece occurs, or conversely, i.e. the second piece on the first piece, allowing the electrical conductivity between the first and second components to be maintained.

According to the configuration described, the first and second pieces are kept in contact all the time during the movement of the second component on the first component, such that the electrical current between the first and second pieces is transmitted, and accordingly between the first and second components at any point of the displacement mentioned before.

In the preferred embodiment of the invention, the second piece is arranged in an area wherein the distance between the second and the first component remains constant throughout the trajectory followed by the second component on the first component.

In this case, the second piece has a configuration equivalent to said trajectory, as the first piece includes an arm provided with a mooring and sliding skid on the configuration of the second piece equivalent to the trajectory followed by the second component on the first component, such that the maintenance of the electrical conductivity between the first and second component is attained.

The configuration of the first piece equivalent to the mentioned trajectory is chosen in such a way that it is the closest between the first and second components so that the arm which constitutes the second piece has the shortest possible length, which simplifies the mentioned connection.

As mentioned herein before, the first piece can have the configuration of the second piece and conversely, in such a way that the result of the electrical connection does not vary, for which purpose in this case the first piece is arranged in the area in which the distance between the second component and the first component remains constant throughout the trajectory followed by the second component on the first component. It has a configuration equivalent to said trajectory, as the second piece is comprised of an arm including a mooring and sliding skid on the configuration of the first piece equivalent to the trajectory followed by the second component on the first one.

The invention also foresees the possibility that the second piece is arranged in an area in which the distance between the second and the first components varies in at least one area of the trajectory followed by the second component on the first component, in which case said second piece has a configuration equivalent to the mentioned trajectory whereas the first piece is provided with a telescopic arm including a mooring and sliding skid on the configuration of the second piece, so that the telescopic arm is extended or contracted depending on the variation in the trajectory distance between the second and the first components, absorbing said variations of distance.

As in the previous case, the configurations of the first and second piece can be reversed, i.e. the first piece can be arranged in an area in which the distance between the second and the first components varies in at least one area of the trajectory followed by the second component on the first component, such that the first piece has a configuration equivalent to the referred trajectory, as the second piece includes a telescopic arm provided with a mooring and sliding skid on the configuration of the first piece.

The preferred embodiment of the invention is applicable in the case wherein the first fixed component is the tail cone of an aircraft and the second component is the horizontal stabilizer, which will be provided with a trimming movement, so that the device of the invention maintains the electrical conductivity between said tail cone and the horizontal stabilizer of the aircraft.

The described configuration allows the replacement of the typical connection hoses with a direct contact device that carries out the function of directly connecting the first and second components.

Next, to provide a better understanding of this specification, and as an integral part thereof, a series of figures in which the object of the invention has been represented with an illustrative and non-restrictive manner are attached.

BRIEF STATEMENT OF THE FIGURES

FIG. 1.—Shows a perspective view of a horizontal stabilizer of an aircraft.

Figure 2:
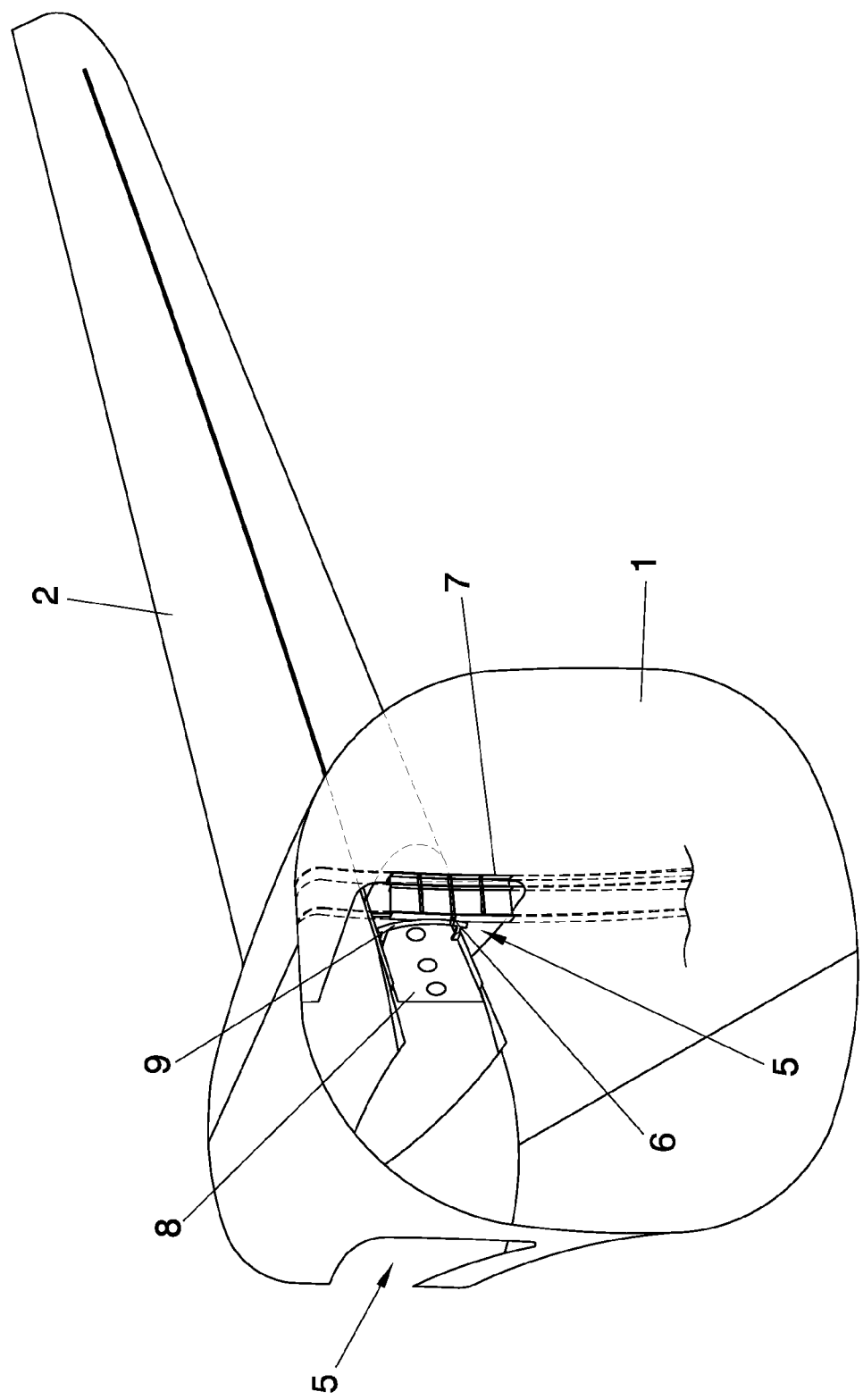

FIG. 2.—Shows a schematic perspective detailed view of the arrangement of a side of the horizontal stabilizer over the tail cone of the fuselage, wherein the electrical conductivity between the fuselage and the horizontal stabilizer is performed by the device of the invention.

Figure 3:
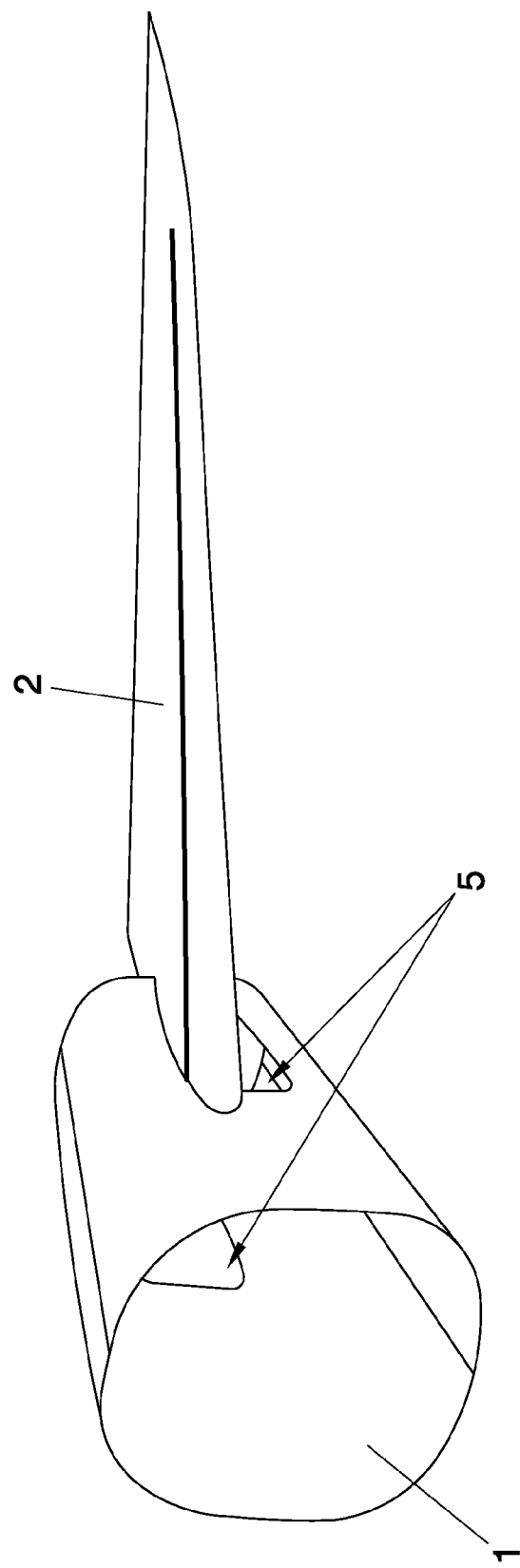

FIG. 3.—Shows a view equivalent to the previous figure from an angle in which the housing in the fuselage of one of the parts that comprises including the horizontal stabilizer is observed, so that said housing allows the trimming movement of the horizontal stabilizer.

Figure 4:
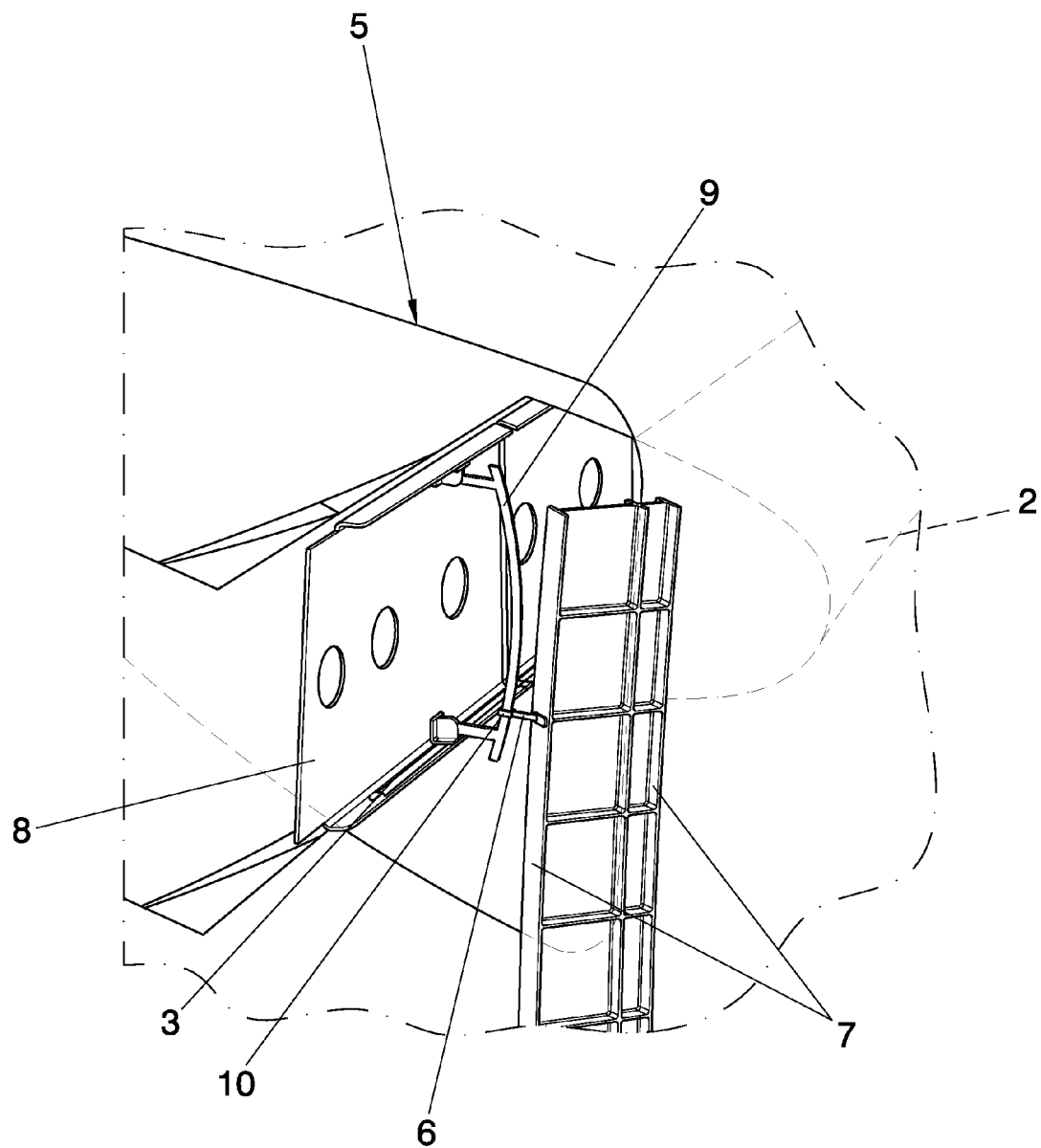

FIG. 4.—Shows a detailed view of the device of the invention according to what it is represented in FIG. 2.

Figure 5:
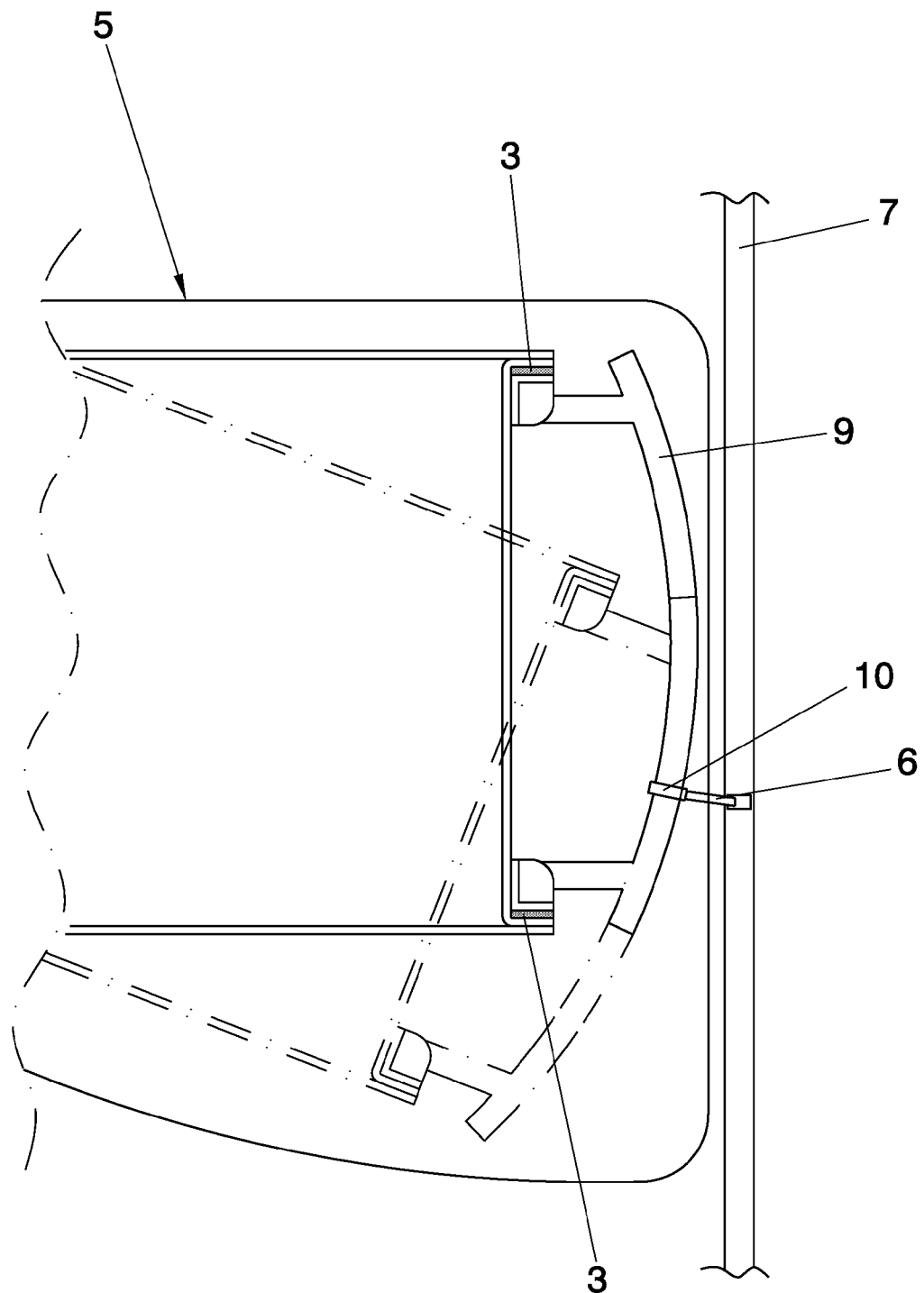

FIG. 5.—Shows a detailed view of the device of the invention in different trimming positions of the horizontal stabilizer.

DESCRIPTION OF THE PREFERRED EMBODIMENT

A description of the invention is made below based on the figures mentioned above.

The embodiment of the invention is focused on the maintenance of the electrical conductivity between a first fixed component which is comprised of the fuselage 1 of an aircraft and a second displaceable component comprised of the horizontal stabilizer 2 (HTP) of an aircraft.

As previously mentioned in a paragraph of the Background of the invention, it is necessary to establish the electrical conductivity between the fuselage 1 and the HTP 2 in order to conduct possible lightning caused by atmospheric agents that may strike the aircraft.

For this purpose, the HTP 2 is provided with four static discharge wicks 3 for each one of the sides of the HTP 2, which go along the torsion box parallel to the front and rear spars and are located on the inner face of the upper and lower coatings of said box. The upper wicks 3 have been drawn by a solid line and the lower wicks 3 by a dashed line.

The horizontal stabilizer 2 can rotate around an axis 4 in the fuselage, for which purpose it is provided with an input window 5 of the HTP 2 whose dimensions allow the trimming movement around the axis 4 arranged at the rear part of the HTP 2, which determines that the displacement of the front part of the HTP 2 follows a trajectory according to considerably long arc. The circumstance happens that the electrical conductivity between the fuselage and the HTP 2 must be maintained along the entire trajectory, as previously mentioned.

For this purpose, the device of the invention is comprised of a first conductive piece which is defined by an arm 6 fixed to the fuselage 1 of the aircraft, and namely, to the frame 7 of the fuselage that is closest to the input window 5 of the HTP 2, and such that said frame 7 is connected to the electrical safety network of the fuselage. Moreover, on the front spar 8, and in contact with the upper and lower static discharge wicks respectively, which constitutes a second piece comprised of an arched profile 9 to said front spar 8 such that the arm 6 is finished off by a skid 10 that attaches and slides on the arched profile 9 in the trimming movement of the HTP 2.

The geometry of the fuselage 1 in the coupling area to the HTP 2 and the kinematics of this second trimming movement, make it possible to find points of the fuselage 1 and HTP 2 that are closer and whose distance remains constant at all times and in any HTP 2 position corresponding to the arched profile 9, which allows the skid to easily slide on the arched profile 9.

Thereby, use of the described structure makes it possible to maintain the electrical conductivity between the fuselage 1 and the HTP 2 in any of its trim positions.

The invention claimed is:

1. A device for providing electrical continuity between aeronautical components with relative movement, applicable in aeronautical structures including at least a first fixed component (1) and a second component (2) displaceable with respect to the first component (1), each of the first component (1) and the second component (2) being provided with an electrically conductive surface; wherein said device includes at least a first conductive piece fixed to the first component (1) and a second conductive piece fixed to the second component (2) displaceable with respect to the first component, the first piece and the second piece being joined together with the possibility of sliding one over the other; and the first piece being connected to the conductive surface of the first component (1) and the second piece being connected to the conductive surface of the second component (2), so that when the second component is displaced with respect to the first component, sliding selected between a sliding of the first piece over the second piece and sliding of the second piece over the first piece, takes place, maintaining the electrical conductivity between the first (1) and second (2) components, wherein the second piece is arranged in an area in which the distance between the second component (2) and the first component (1) varies in at least one area of the trajectory followed by the second component (2) on the first component (1); and said second piece having a configuration equivalent to said trajectory; the first piece comprising a telescopic arm provided with a mooring and sliding skid (10) on the configuration of the second piece (2) equivalent to the trajectory followed by the second component (2) on the first component (1).

2. A device for providing electrical continuity between aeronautical components with relative movement, applicable in aeronautical structures including at least a first fixed component (1) and a second component (2) displaceable with respect to the first component (1), each of the first component (1) and the second component (2) being provided with an electrically conductive surface; wherein said device includes at least a first conductive piece fixed to the first component 1 and a second conductive niece fixed to the second component (2) displaceable with respect to the first component, the first piece and the second piece being joined together with the possibility of sliding one over the other; and the first piece being connected to the conductive surface of the first component (1) and the second piece being connected to the conductive surface of the second component (2), so that when the second component is displaced with respect to the first component, sliding selected between a sliding of the first piece over the second piece and sliding of the second piece over the first piece, takes place, maintaining the electrical conductivity between the first (1) and second (2) component, wherein the first piece is arranged in an area in which the distance between the second component (2) and the first component (1) varies at least in one area of the trajectory followed by the second component (2) on the first component (1); and said first piece having a configuration equivalent to said trajectory; the second piece comprising a telescopic arm provided with a mooring and sliding skid (10) on the configuration of the first piece (2) equivalent to the trajectory followed by the second component (2) on the first component (1).

3. A device for providing electrical continuity between aeronautical components with relative movement, applicable in aeronautical structures including at least a first fixed component (1) and a second component (2) displaceable with respect to the first component (1), each of the first component (1) and the second component (2) being provided with an electrically conductive surface; wherein said device includes at least a first conductive piece fixed to the first component 1 and a second conductive niece fixed to the second component (2) displaceable with respect to the first component, the first piece and the second piece being joined together with the possibility of sliding one over the other; and the first piece being connected to the conductive surface of the first component (1) and the second piece being connected to the conductive surface of the second component (2), so that when the second component is displaced with respect to the first component, sliding selected between a sliding of the first piece over the second piece and sliding of the second piece over the first piece, takes place, maintaining the electrical conductivity between the first (1) and second (2) components, wherein the first fixed component (1) is a tail cone of the fuselage (1) of an aircraft, and the second component (2) is the horizontal stabilizer of an aircraft.

4. A device for providing electrical continuity between aeronautical components with relative movement, according to claim 3, wherein the second piece is arranged in an area in which the distance between the second component (2) and the first component (1) remains constant throughout the trajectory followed by the second component (2) on the first component (1); and said second piece having a configuration (9) equivalent to said trajectory; the first piece comprising an arm (6) provided with a mooring and sliding skid (10) on the configuration of the second piece (9) equivalent to the trajectory followed by the second component (2) on the first component (1).

5. A device for providing electrical continuity between aeronautical components with relative movement, according to claim 3, wherein the first piece is arranged in an area in which the distance between the second component (2) and the first component (1) remains constant throughout the trajectory followed by the second component (2) on the first component(1); and said first piece having a configuration (9) equivalent to said trajectory; the second piece comprising an arm (6) provided with a mooring and sliding skid (10) on the configuration of the first piece (9) equivalent to the trajectory followed by the second component (2) on the first component (1).

* * * * *